Oct. 26, 1954  E. A. ROCKWELL  2,692,611
PROPORTIONAL PRESSURE VALVE
Filed Aug. 24, 1951  3 Sheets-Sheet 3
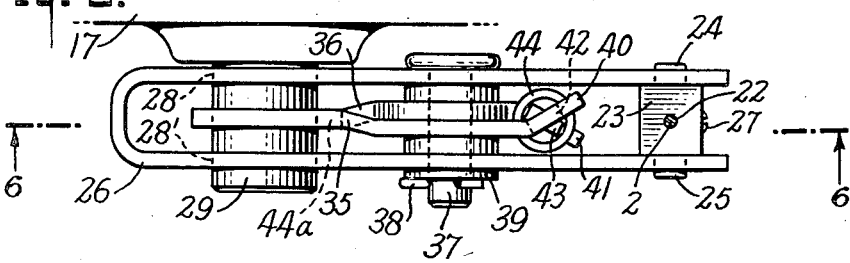
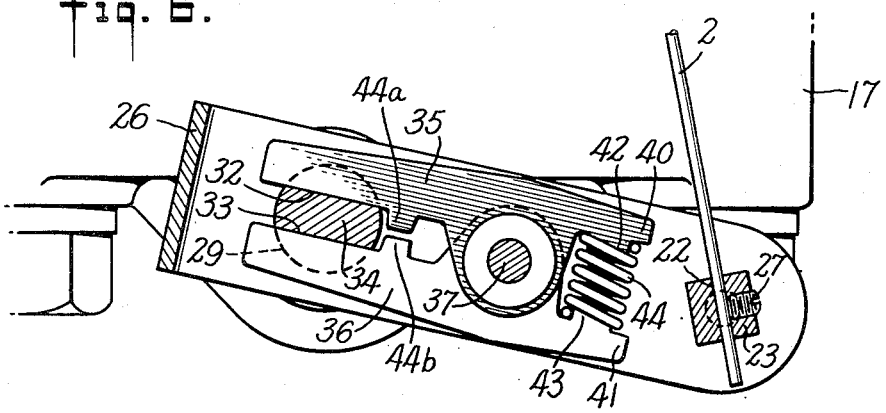
INVENTOR
Edward A. Rockwell
BY
ATTORNEY

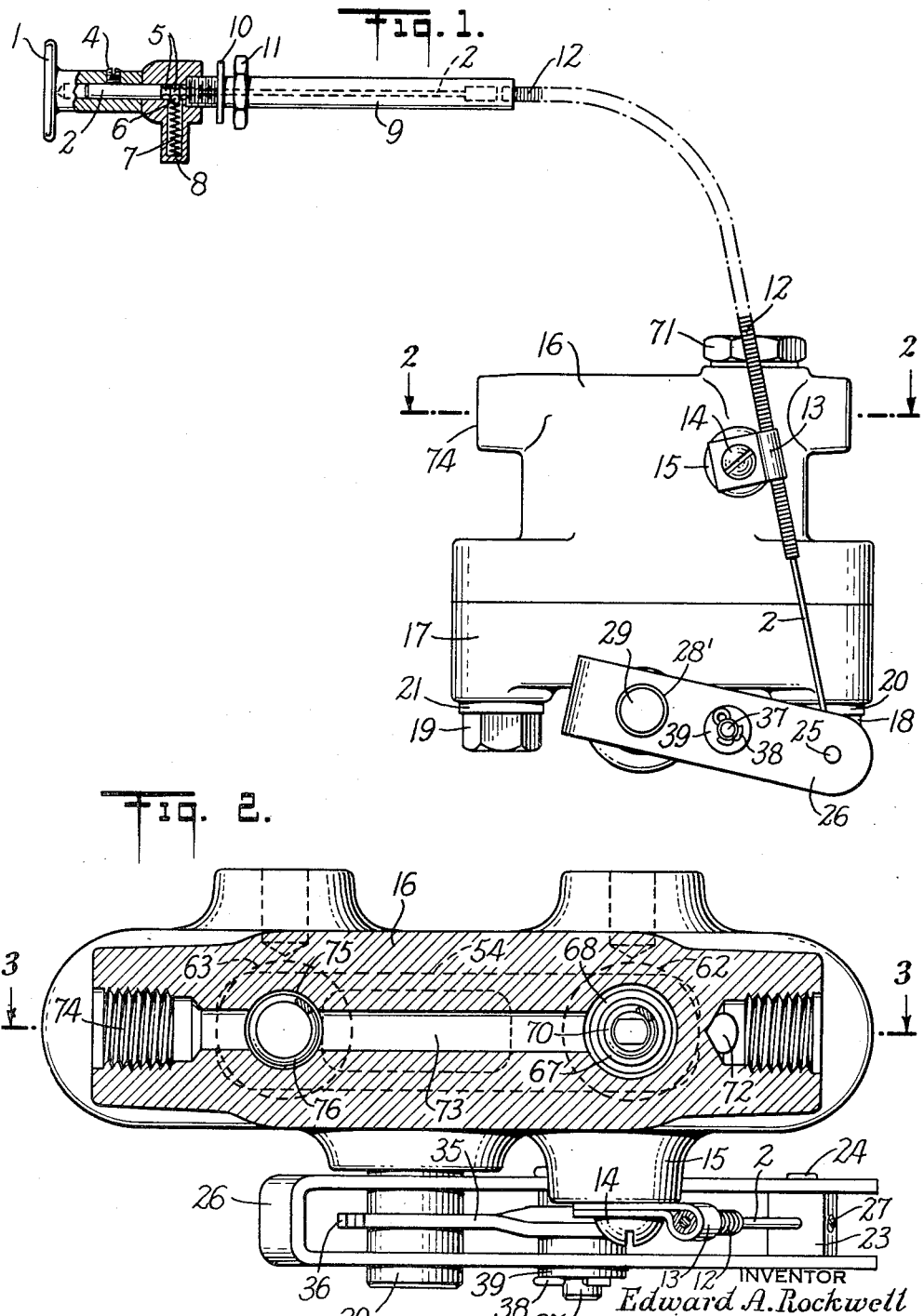

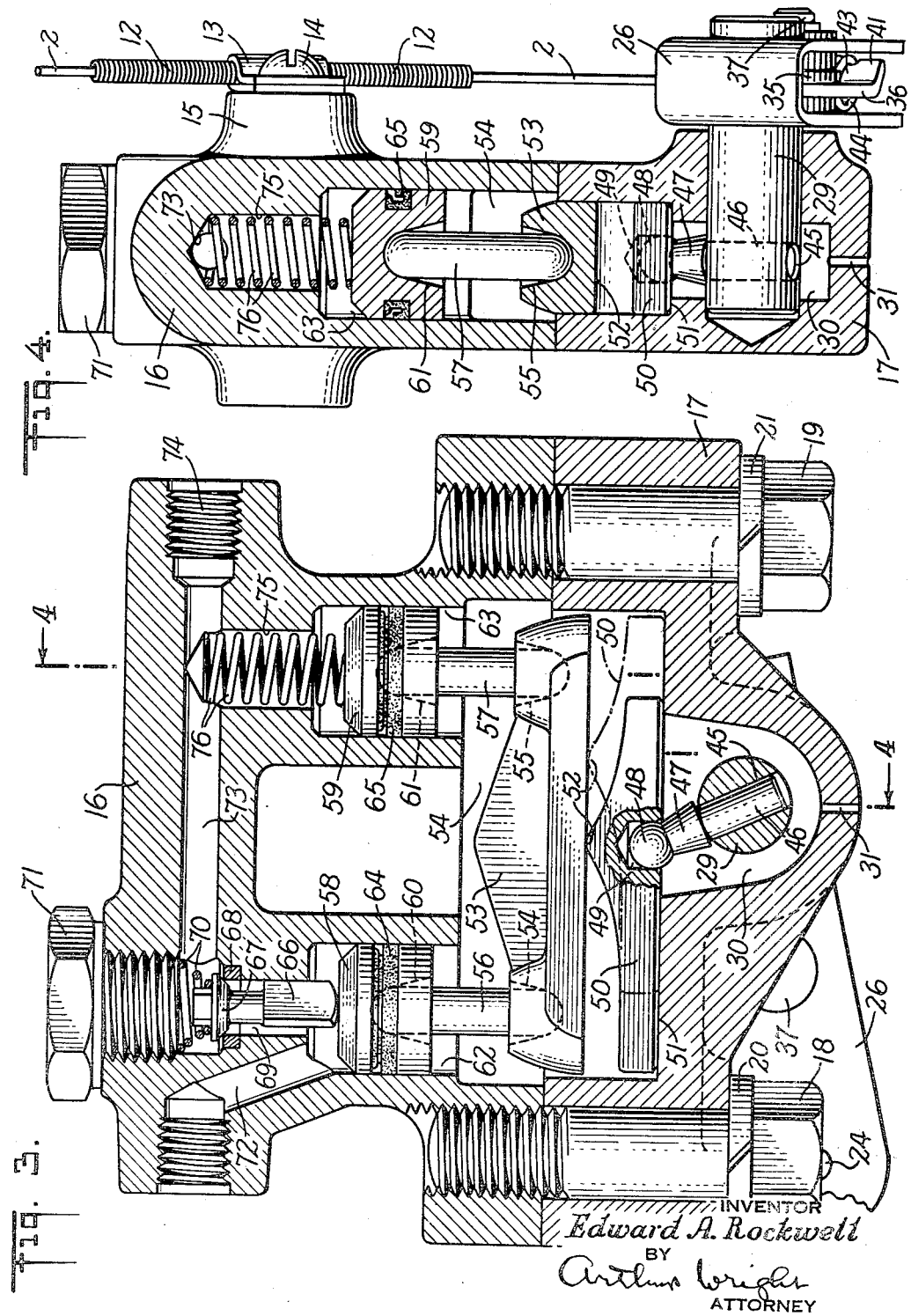

Patented Oct. 26, 1954

2,692,611

UNITED STATES PATENT OFFICE 2,692,611

PROPORTIONAL PRESSURE VALVE

Edward A. Rockwell, West Los Angeles, Calif.

Application August 24, 1951, Serial No. 243,385

14 Claims. (Cl. 137—503)

My invention relates particularly to means for delivering a fluid pressure or pressures proportional to an incoming or control pressure.

This invention is an improvement upon the subject matter of my application Ser. No. 539,583, upon Proportional Pressure Distributor Valve, filed June 9, 1944, Patent No. 2,568,900, granted September 25, 1951, and the division thereof, Patent No. 2,427,623, upon Adjustable Bowden Wire, granted September 16, 1947.

An object of the present invention is to provide a more effective and simple means for accomplishing the delivery of such controlled fluid or hydraulic pressures. Another object of my invention is to provide a leverage system by means of which the variable proportional pressure mechanism may be operated so that for a given travel of the proportional pressure adjusting mechanism the Bowden wire for operating the same can have an increased travel with the application of less force. Still another object is to simplify the arrangement of the liquid passageways so that the liquid connections may be made on approximately the same level by having the controlling pistons spaced from each other on opposite sides of a pressure adjusting lever and by splitting the casting into two parts, which permits a convenient assembly of the apparatus. Also, a further object is to operate the same by means of an adjustable controlling device which is free from danger of breakage due to the operation of the apparatus. Still another object is to provide a more simple and effective setting or adjusting device which has a lost motion connection to the valve controlling the proportional pressures, and which may be adjusted while under load.

While my invention is capable of being carried out in many different ways, by way of illustration I have shown certain forms thereof in the accompanying drawings, in which:

Fig. 1 is a side elevation of a proportional pressure valve made in accordance with my invention;

Fig. 2 is a plan view thereof;

Fig. 3 is a vertical section thereof taken on line 3—3 of Fig. 2;

Fig. 4 is a vertical section of the same taken on line 4—4 of Fig. 3;

Fig. 5 is a plan view of the lost motion adjusting lever shown in Fig. 1 and at the right of Fig. 4; and Fig. 6 is an enlarged side elevation of the proportional pressure valve taken from the right side of Fig. 4 but showing the adjusting lever in section taken on line 6—6 of Fig. 5.

In the drawings, I have shown a handle 1 adapted to be mounted, for instance, on the dash of an automobile, not shown, which has a centrally located longitudinal recess or hole for receiving one end of a Bowden wire 2 held in place in the handle 1 by a set screw 4 so that the Bowden wire 2 may be adjusted outwardly or inwardly manually with regard to the said dash inasmuch as the said wire 2 carries a series of annular recesses 5 cooperating with a ball 6 pressed upwardly by a spring 7 in a cylinder 8, on an internally screw-threaded bracket screwed onto an externally screw-threaded tube 9 passing through the dash and having thereon a washer 10 and locking nut 11 for holding the same in place. On the inner end of the tube 9 there is supported or fastened in any desired manner a flexible metal conduit 12 of the usual kind around the Bowden wire 2. The metal conduit 12 is held in place at its other end by a split clamp 13 fastened by a screw 14 to a boss 15 on an upper valve casing 16, which is secured to a lower valve casing 17 by screws 18 and 19 having lock washers 20 and 21.

The lower or inner end of the Bowden wire 2 is tightly fastened in a hole 22 to a swivel bearing 23 having reduced ends 24 and 25 pivotally received in the two outer ends of a U-shaped adjusting lever 26. A set screw 27 secures the Bowden wire 2 in the swivel bearing 23. The inner U-shaped end of the lever 26 has circular openings 28 and 28' to pivotally support this end of the lever 26 on a shaft 29 carried in the lower valve casing 17 in a recess 30 having an oil drain 31. Furthermore, on the said shaft 29 there are two segmental opposed recesses 32 and 33 forming a squared or flat portion 34 on the shaft 29. This flat portion 34 is releasably engaged on the opposite sides thereof by levers 35 and 36 respectively, located on a pivot pin 37 carried in the two ends of the U-shaped adjusting lever 26 and held therein by means of a cotter pin 38 and a washer 39. These two levers 35 and 36 also have crossed rear ends 40 and 41 with tongues 42 and 43 thereon to hold in place a spring 44 pressing the rear ends normally apart, so as to hold the two levers 35 and 36 releasably and yieldingly against the flat portion 34 of the shaft 29. Lugs 44a and 44b on the levers 35 and 36 prevent the spring 44 from escaping.

The said shaft 29, furthermore, has within the casing 17 a transverse hole 45 to receive tightly therein a rocker pin 46 provided at its upper end with a tapered flange 47 carrying at the top thereof a spherical knob 48 which is received in a recess 49 in the underside of a shiftable pivot plate 50 sliding on a horizontal surface 51 within the casing 17. The pivot plate 50 has on its upper side an adjusting rocker edge 52 for supporting pivotally a lever 53 located in the lower casing 17 but extending into a chamber 54 in the upper casing 16. This lever 53 has at its two ends, respectively, sockets 54 and 55 which receive, respectively, the lower ends of piston rods 56 and 57, which support at their upper ends pistons 58 and 59, by means of sockets 60 and 61, located in cylinders 62 and 63, in the upper valve casing 16. The pistons 58 and 59 have U-shaped seals 64 and 65. The piston 59 is particularly arranged so as to have ample clearance from the casing 16 during the release of the pressure liquid.

Above the piston 58 there is a triangular valve stem 66 carrying a valve 67 operating on a valve seat ring 68 in a valve passageway 69, the valve 67 being urged towards its seat 68 by a spring 70 supported on a screw plug 71 in the casing 16.

The valve 67, 68 controls the delivery of the pressure fluid or liquid at the desired pressure through a passageway or port 72 to the front wheel brakes (not shown) or any other device to be operated thereby. The valve 67, 68 is normally held open by the piston 58 so as normally to supply the pressure fluid to the delivery port 72 from a horizontal inlet passageway 73 having an inlet port 74 which leads to the rear wheel brakes and likewise to the usual pedal-operated master cylinder (not shown), as a single source of pulsating pressure. The inlet passage 73, furthermore, has a branch passage 75 carrying a spring 76 which normally presses downwardly the piston 59 so as thereby to normally unseat the valve 67.

In the operation of the apparatus, the master cylinder liquid supplied by manual pressure will operate the rear wheel brakes and simultaneously will be received in the inlet chamber or port 74 and passageway 73 and, accordingly, will be delivered by the normally open valve 67, 68 to the front wheel brakes through the port 72. The pressure at which the liquid is delivered to the front wheel brakes will, however, depend upon the adjustment of the pivotal edge 52, the change in the position of which is made by the handle 1 on the dash of the automobile. By the change in the position of the pivotal edge 52 the relative lengths of the lever arms between the said edge 52 and the respective plungers 58 and 59 can be adjusted so as to deliver a pressure to the front brakes by the port 72 having the desired proportion to the pressure at the inlet port 74 for operating the rear brakes or other devices to be operated. In other words, the fluid pressure delivered to the front brakes will be cut off from the inlet passageway 73 when the front brake pressure has reached the proportion of the rear brake fluid pressure determined by the adjusted position of the pivot edge 52. However, upon the decrease or release of the master cylinder pressure the valve 67 will again be opened, as the strength of the spring 70 is normally overcome by the spring 76.

At any time, a setting or selection may be made of the Bowden wire 2 by sliding the pivot plate 50 by means of the spherical knob 48 into any desired new position. Furthermore, if there is any undue relative force exerted from the Bowden wire 2 on the shaft 29, or vice versa, the yielding or lost-motion connection between the levers 35 and 36 and the flat portion 34 of the shaft 29 will permit relative movement between the same, so as to prevent breakage of the parts.

While I have described my invention above in detail I wish it to be understood that many changes may be made therein without departing from the spirit of the same.

I claim:

1. A proportional pressure mechanism, comprising an inlet passage for receiving pressure fluid, a delivery pasasge connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated elements responsive, respectively, to the received and delivered fluid pressures.

2. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated elements responsive, respectively, to the received and delivered fluid pressures, said pivot member being in the form of a plate slidingly supported on one side and having a pivotal edge on the other side thereof.

3. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, the delivered pressure plunger having a valve operated thereby connecting the inlet passage with the delivery pasasge.

4. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, said pivot member being in the form of a plate slidingly supported on one side and having a pivotal edge on the other side thereof, the delivered pressure plunger having a valve operated thereby connecting the inlet passage with the delivery passage.

5. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, the delivered pressure plunger having a spring-pressed normally open valve connecting the inlet passage, said valve being operated by said plunger and subject to said spring pressure with the delivery passage.

6. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, said pivot member being in the form of a plate slidingly supported on one side and having a pivotal edge on the other side thereof, the delivered pressure plunger having a spring-pressed normally open valve connecting the inlet passage, said valve being operated by said plunger and subject to said spring pressure with the delivery passage.

7. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, the delivered pressure plunger having a spring-pressed normally open valve connecting the inlet passage, said valve being operated by said plunger and subject to said spring pressure with the delivery passage and the inlet pressure plunger having a spring urging it in opposition to the movement by the valve spring.

8. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, said pivot member being in the form of a plate slidingly supported on one side and having a pivotal edge on the other side thereof, the delivered pressure plunger having a spring-pressed normally open valve connecting the inlet passage, said valve being operated by said plunger and subject to said spring pressure with the delivery passage and the inlet pressure plunger having a spring urging it in opposition to the movement by the valve spring.

9. A proportional pressure mechanism, comprising an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated elements responsive, respectively, to the received and delivered fluid pressures, said inlet passage and delivery passage having connections for work performance operable at the proportionate pressures thereof.

10. A proportional pressure mechanism, comprising a two-part separable casing, an inlet passage for receiving a pressure fluid, a delivery passage connected thereto for delivering a fluid pressure varying from said supply pressure, a control means for selecting at will the variations of said delivered pressure, and a device controlled by said means for determining the proportion of the delivered pressure to the said fluid pressure received, comprising a rocker lever, a pivot member adjustable by said control means on which the rocker lever is pivoted, the lever on opposite sides of said pivot having fluid pressure actuated plungers responsive, respectively, to the received and delivered fluid pressures, said pivot member being in the form of a plate slidingly supported on one side from one of said casing parts and having a pivotal edge on the other side thereof, the delivered pressure plunger having a valve operated thereby connecting the inlet passage with the delivery passage and the rocker lever, as well as the said passages being located in the other part of said casing.

11. A proportional pressure distributor means having a source of supply thereto of a controlling hydraulic liquid under pressure, including a chamber receiving said liquid and adapted to be controlled at will, a delivery passage for work performance having a connection provided with a delivery and return valve leading to said chamber for delivering and returning to said chamber said hydraulic liquid, and an adjusting means in said connection for adjusting the pressure of the delivered hydraulic liquid, adapted to maintain a constant differential of said pressure of said delivered hydraulic liquid with regard to the pressure of the controlling hydraulic liquid throughout the range of pressure of said controlling hydraulic liquid, the adjusted pressure of said delivered hydraulic liquid being reactive against pressure of said controlling hydraulic liquid, the said adjusting means comprising a rocker lever and an adjustable pivot member on which the rocker lever is pivoted, the said lever being responsive on opposite sides of said pivot, respectively, to the pressures of the controlling and delivered hydraulic liquid.

12. A proportional pressure distributor means having a source of supply thereto of a controlling hydraulic liquid under pressure, including a chamber receiving said liquid and adapted to be controlled at will, a delivery passage for work performance having a connection provided with a valve and valve seat leading to said chamber for delivering and releasing through said valve seat said hydraulic liquid, and an adjusting means in said connection for adjusting the pressure of the delivered hydraulic liquid, adapted to maintain a constant differential of said pressure with regard to the pressure of the controlling hydraulic liquid throughout the range of pressure of said controlling hydraulic liquid, the adjusted pressure of said delivered hydraulic liquid being reactive against the pressure of said controlling hydraulic liquid, said adjusting means comprising a plunger and a chamber for the plunger in communication with the valve and having a freely open communication with the delivery connection so as to increase the volume of the chamber by the movement of said plunger away from the valve when the controlling hydraulic pressure is being released, the said adjusting means comprising a rocker lever and an adjustable pivot member on which the rocker lever is pivoted, the said lever being responsive on opposite sides of said pivot, respectively, to the pressures of the controlling and delivered hydraulic liquid.

13. A proportional pressure distributor means having a source of supply thereto of a controlling hydraulic liquid under pressure, including a chamber receiving said liquid and adapted to be controlled at will, a delivery passage for work performance having a connection provided with a valve and valve seat leading to said chamber for delivering and releasing through said valve seat said hydraulic liquid, and an adjusting means in said connection for adjusting the pressure of the delivered hydraulic liquid adapted to maintain a constant differential of said pressure with regard to the pressure of the controlling hydraulic liquid throughout the range of pressure of said controlling hydraulic liquid, said adjusting means comprising an adjustable fulcrum in contact with two movable lever arms connected together at said fulcrum in the form of a movable slidable pivot carried by a movable member, a plunger and a chamber for the plunger in communication with the valve and having a freely open communication with the delivery connection so as to increase the volume of the chamber by the movement of said plunger away from the valve when the controlling hydraulic pressure is being released, the said adjusting means forming a rocker lever with an adjustable pivot member on which the rocker lever is pivoted, the said lever being responsive on opposite sides of said pivot, respectively, to the pressures of the controlling and delivered hydraulic liquid.

14. A proportional pressure distributor means having a source of supply thereto of a controlling hydraulic liquid under pressure, including a chamber receiving said liquid as a single source of pulsating pressure having therein a piston and adapted to be controlled at will, a delivery passage for work performance, provided with a valve and valve seat, having a connection leading to said chamber and said piston for delivering and releasing through said valve seat said hydraulic liquid, and an adjustable means in said connection cooperating with said piston for adjusting the pressure of the delivered hydraulic liquid, adapted to maintain a constant differential of said pressure with regard to the pressure of the controlling hydraulic liquid throughout the range of said pulsating pressure of said controlling hydraulic liquid, the adjusted pressure of said delivered hydraulic liquid being reactive against the pressure of said controlling hydraulic liquid, said adjusting means comprising a plunger and a chamber for the plunger in communication with the valve and having a freely open communication with the delivery passage so as to increase the volume of the chamber by the movement of said plunger away from the valve when the controlling hydraulic pressure is being released, the said adjusting means comprising a rocker lever and an adjustable pivot member on which the rocker lever is pivoted, the said lever being responsive on opposite sides of said pivot, respectively to the pressures of the controlling and delivered hydraulic liquid.

References Cited in the file of this patent

UNITED STATES PATENTS

| Number | Name | Date |
|---|---|---|
| 396,858 | Carver | Jan. 29, 1889 |
| 630,160 | Ayasse | Aug. 1, 1899 |
| 1,670,615 | Eggleston | May 22, 1928 |
| 1,734,687 | McEwan | Nov. 5, 1929 |
| 2,568,900 | Rockwell | Sept. 25, 1951 |